(12) United States Patent
Ligabue et al.

(10) Patent No.: US 10,777,789 B2
(45) Date of Patent: Sep. 15, 2020

(54) VEHICULAR BATTERY PACK

(71) Applicant: FERRARI S.p.A., Modena (IT)

(72) Inventors: Elena Ligabue, Serramazzoni (IT); Luca Poggio, Casalecchio di Reno (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 16/276,385

(22) Filed: Feb. 14, 2019

(65) Prior Publication Data

US 2019/0259989 A1 Aug. 22, 2019

(30) Foreign Application Priority Data

Feb. 16, 2018 (IT) .................... 102018000002772

(51) Int. Cl.

| | |
|---|---|
| *H01M 4/02* | (2006.01) |
| *H01M 2/10* | (2006.01) |
| *H01M 10/613* | (2014.01) |
| *H01M 10/625* | (2014.01) |
| *H01M 10/647* | (2014.01) |
| *H01M 10/6551* | (2014.01) |
| *H01M 10/6567* | (2014.01) |
| *H01M 2/02* | (2006.01) |
| *H01M 2/20* | (2006.01) |
| *H01M 2/26* | (2006.01) |
| *H01M 2/30* | (2006.01) |
| *H01M 10/48* | (2006.01) |
| *H01M 10/42* | (2006.01) |
| *H01M 10/6557* | (2014.01) |
| *H01M 10/6556* | (2014.01) |
| *H01M 10/6555* | (2014.01) |

(52) U.S. Cl.
CPC ....... *H01M 2/1077* (2013.01); *H01M 2/0237* (2013.01); *H01M 2/206* (2013.01); *H01M 2/266* (2013.01); *H01M 2/30* (2013.01); *H01M 10/425* (2013.01); *H01M 10/482* (2013.01); *H01M 10/613* (2015.04); *H01M 10/625* (2015.04); *H01M 10/647* (2015.04); *H01M 10/6551* (2015.04); *H01M 10/6555* (2015.04); *H01M 10/6556* (2015.04); *H01M 10/6557* (2015.04); *H01M 10/6567* (2015.04); *H01M 2010/4271* (2013.01); *H01M 2010/4278* (2013.01); *H01M 2220/20* (2013.01)

(58) Field of Classification Search
CPC ....................................................... H01M 4/02
See application file for complete search history.

(56) References Cited

U.S. PATENT DOCUMENTS

| | | |
|---|---|---|
| 2013/0216872 A1 | 8/2013 | Fuhr et al. |
| 2015/0283965 A1 | 10/2015 | Lynds et al. |
| 2017/0343615 A1* | 11/2017 | Lee .................. H01M 2/20 |
| 2018/0040932 A1* | 2/2018 | Lee .................. H01M 10/6556 |

FOREIGN PATENT DOCUMENTS

WO    2012052131 A2    4/2012

OTHER PUBLICATIONS

International Search Report issued in Italian Patent Application No. IT 201800002772, completed Nov. 12, 2018; 9 pages.

* cited by examiner

*Primary Examiner* — Jacob B Marks
(74) *Attorney, Agent, or Firm* — Cantor Colburn LLP

(57) ABSTRACT

A vehicular battery pack comprising a parallelepiped-shaped container, wherein cells are grouped in layers one above the other in the container, wherein each of said battery layers is connected to a face of a substantially planar-shaped tray through relative terminals of the same cells.

22 Claims, 8 Drawing Sheets

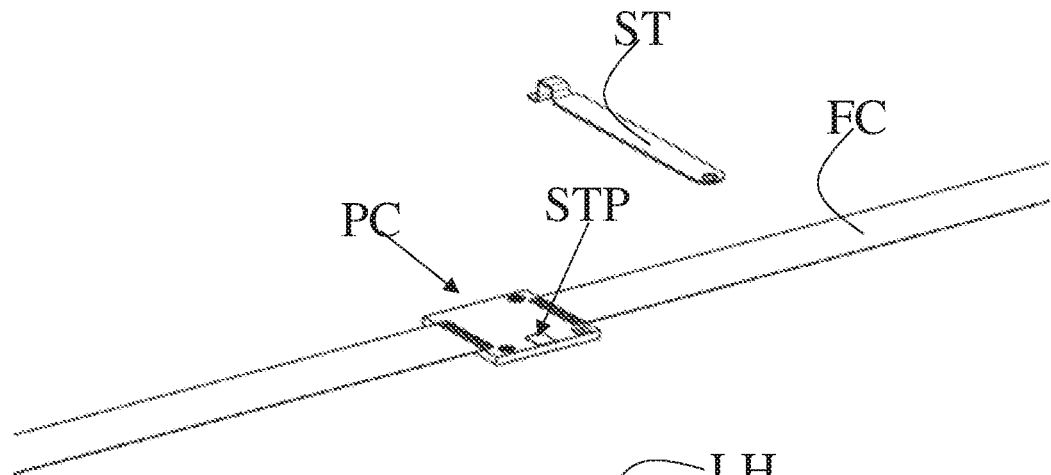
Fig. 6
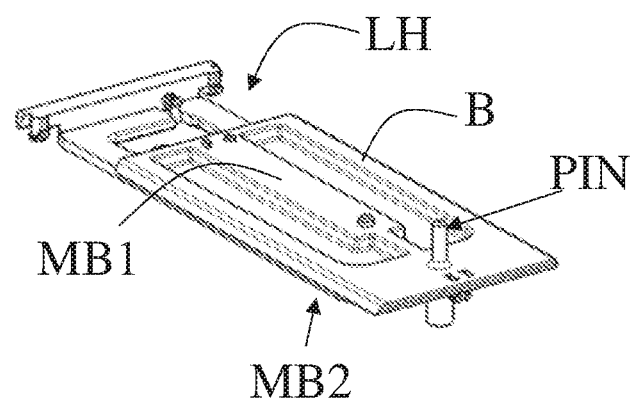
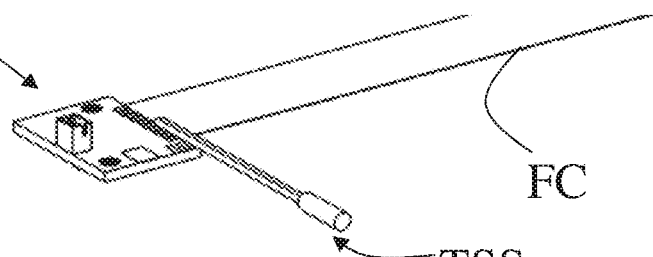
Fig. 7
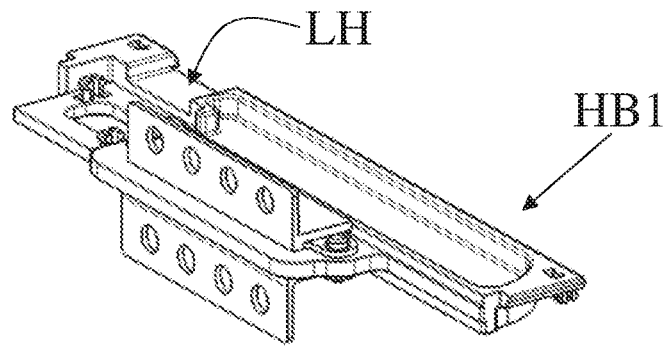

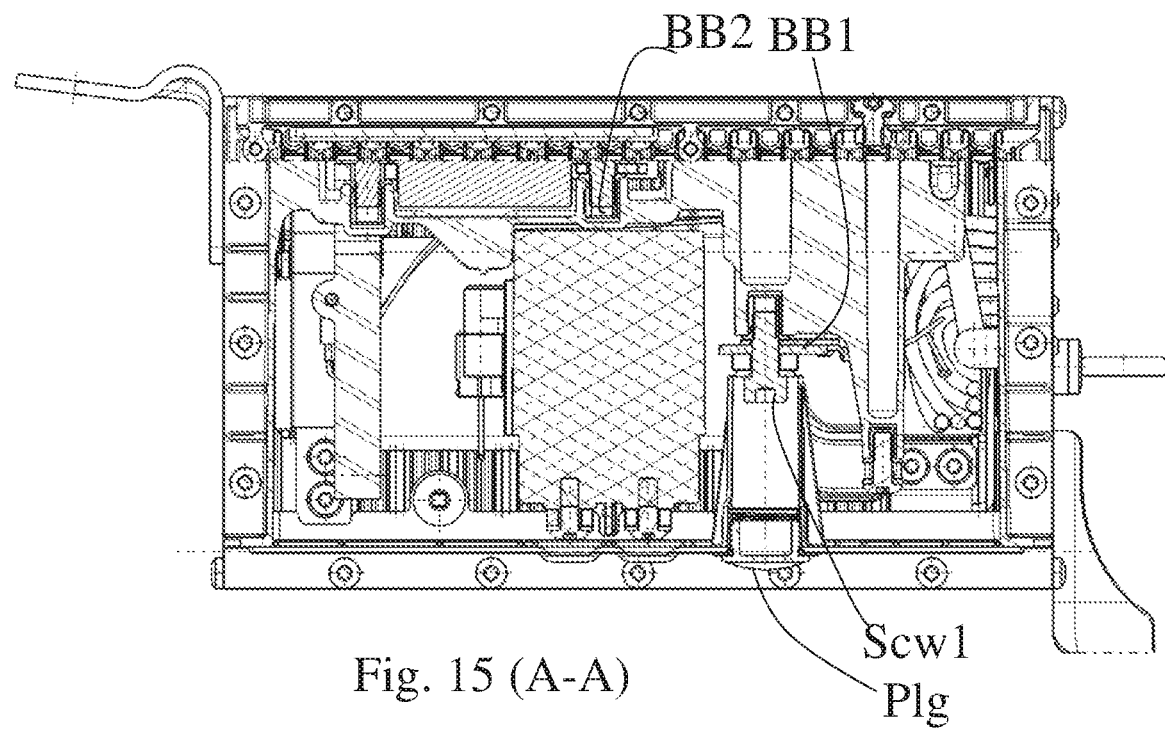
Fig. 15 (A-A)
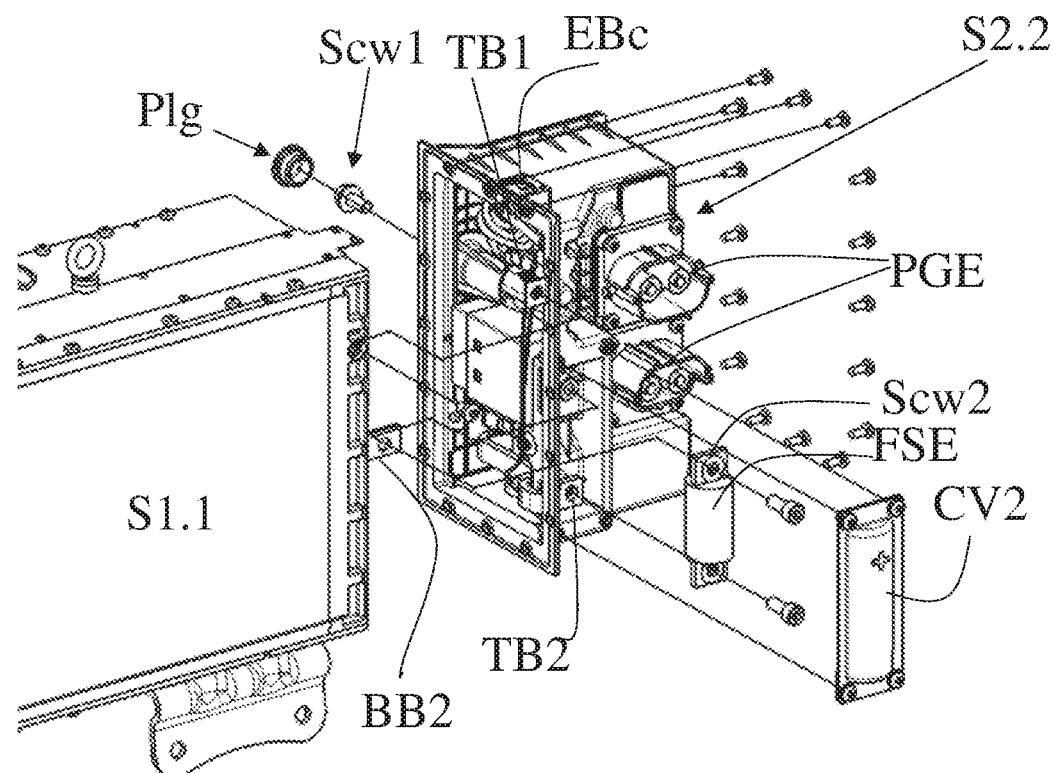
Fig. 16

VEHICULAR BATTERY PACK

CROSS-REFERENCE TO RELATED APPLICATIONS

This Patent Application claims priority from Italian Patent Application No. 102018000002772 filed on Feb. 16, 2018, the entire disclosure of which is incorporated herein by reference.

FIELD OF APPLICATION OF THE INVENTION

The present invention refers to the field of energy storage systems in the automobile sector and in particular to a battery pack comprising a plurality of electrically interconnected batteries.

DISCUSSION OF THE PRIOR ART

Because of their high density, lithium batteries are enabling the effective implementation of electric technology in the automobile sector.

Lithium polymers currently represent the state of the art in the production of high-capacity batteries.

A known solution envisages the use of small cylindrical batteries connected in series in strings. One or more strings are then connected in parallel to obtain voltage and current values compatible with the inverter that drives the electric traction motor. This solution results in a lot of unused space and the energy density could therefore be improved.

Solutions are known which envisage the production of cells specifically developed for use in the automobile sector, in which the cells are stacked, without casing, one on top of the other. Production costs are too high and the reliability of the battery pack is not assured.

The battery modules usually available on the market to power smartphones and tablets consist of flat-pouch batteries, which have a very small thickness in relation to their other dimensions. Such batteries have two very wide opposite faces through which the heat is almost entirely dissipated and four thin and elongated sides with the positive and negative terminals of the cell arranged on one or on two opposite sides.

Each module comprises a cell and a relative BMC (battery management control) monitoring device to monitor different operating parameters of the battery and disconnect it if necessary for safety reasons and/or to protect the actual battery.

The various BMC devices of the battery pack are then connected as slaves to a so-called BMS (battery management system) which, as master, processes the information acquired by the BMC devices and interacts with the vehicle unit, generally the VCU (vehicle control unit) that controls various vehicle sub-systems, including the battery pack.

The cells must be connected to appropriate heat dissipating elements, but at the same time it is important to ensure that the connection of the cells to such dissipating elements does not affect heat exchange.

SUMMARY OF THE INVENTION

The purpose of the present invention is to provide a vehicular battery pack based on conventional individual cells of the flat-pouch type in which the terminals are arranged on opposite sides of the cell.

The idea at the basis of the present invention is to group the cells together in layers at the centre of the battery pack, connect such layers to planar-shaped trays suitable to dissipate the heat produced by said cells and implement the connection to a tray by means of said positive and negative terminals of the cells, without using adhesives or other materials that could affect said heat exchange.

In other words, said terminals of the cells perform a dual function of electrical use of the respective cell and of connecting the cell to a respective tray.

Preferably, the battery pack is parallelepiped in shape with
the vehicle unit,
the cooling walls and
said layers of cells
lying on mutually perpendicular planes.

In the parallelepiped-shaped container, the first lateral walls, arranged opposite one another, have the purpose of cooling down the cells, second two lateral walls, arranged opposite one another, have the purpose,
one of housing said vehicle unit including the BMC devices and a BMS (battery management system) that oversees the operation of the BMC devices, and
the other of housing the high-voltage connections and the relative safety devices.

The last two lateral walls that complete the parallelepiped, opposite one another, principally have the functions of containing and compressing the layers of cells.

Therefore, the BMC devices are not inside the pack with the respective cells they control. This fact advantageously allows only the cells to be cooled, thus optimising the volume inside the battery pack. Nevertheless, with the battery pack according to the present invention the condition and operation of each individual cell can be monitored.

A first layer of cells is fixed to a face of a planar tray and two opposite edges of the planar tray are physically and thermally in contact with said first two lateral cooling walls of the container so as to transmit any heat generated by the cells to said first two lateral walls.

Preferably, each layer of cells defines an alignment of cells and on each opposite side of each cell facing an adjacent cell there is a terminal of that cell in order to be able to connect said alignments of cells in series.

A flat cable is attached to one face of the tray interposed between said face of the tray and a respective alignment of cells. Said flat cable operatively interconnects the cells of said alignment to a BMC device, preferably a multi-channel device.

A flat cable generally comprises a substrate of plastic material on which metal tracks are arranged, using methods known in the prior art.

Advantageously, the fact that the BMC device is not included in the pack with a relative cell enables the use of one BMC device capable of monitoring the condition of two or more cells of a same layer and preferably of two adjacent layers.

Preferably, the tray supports two alignments of cells each connected to one of the opposite faces of the tray and the same flat cable serves both alignments of cells through appropriate openings provided in the tray.

According to a preferred embodiment of the invention, at the terminals of each cell, the tray comprises a through opening, engaged by a cap of insulating material to which a band of metal is attached that is compatible to be welded to the terminals of adjacent cells. Advantageously, the cap performs several functions:
it insulates the terminals of the cells from the relative tray,
it simplifies the interconnection of the cells,
it allows said flat cable to be connected to the terminals of the cells.

According to a preferred embodiment of the invention, the alignments defined by each layer of cells arranged in the battery pack are mutually interconnected in series, so that all of the cells of the battery pack are in series. Clearly, a head cell, that is to say, a cell proximal to one of said second walls, is electrically connected to another head cell of an adjacent alignment. Said adjacent alignment may be supported by the same tray or by an adjacent tray.

In the first case, when the layers have been arranged in the battery pack, before fitting the second walls, a U-shaped bridge is used to mutually connect the terminals of the head cells of a same edge connected to opposite faces of a same tray. Vice versa, when the head cells belong to different trays, two L-shaped half-bridges are used and connected to one another.

The claims describe preferred embodiments of the invention and form an integral part of the present description.

BRIEF DESCRIPTION OF THE DRAWINGS

Further purposes and advantages of the present invention will become clear from the following detailed description of a preferred embodiment (and alternative embodiments) thereof and from the accompanying drawings which are merely illustrative and not limiting, in which:

FIGS. 6 and 7 are enlarged views of details of FIG. 3;

FIG. 15 is a quasi-cross-sectional view along the line AA of FIG. 14;

FIG. 16 is a partially exploded view in perspective of the wall shown in FIG. 14.

In the figures the same reference numerals and letters indicate the same parts or components.

Within the scope of the present description, the term "second" component does not imply the presence of a "first" component. Such terms are simply used for the sake of clarity and should not be considered as limiting the scope of the invention.

DETAILED DESCRIPTION OF EMBODIMENTS OF THE INVENTION

Figure 1:
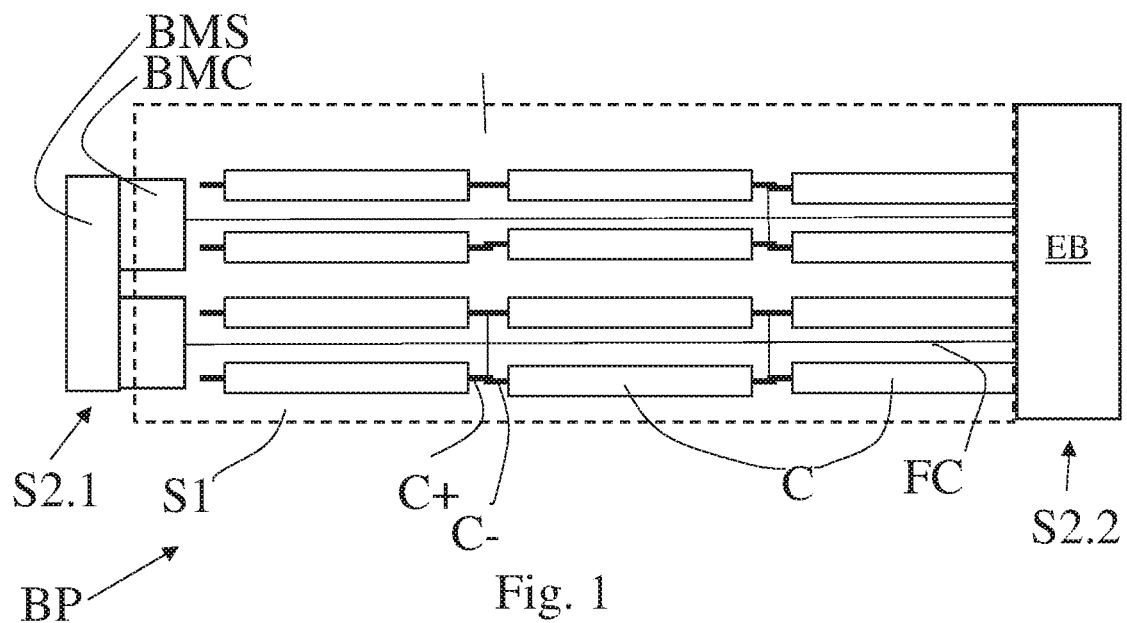
FIG. 1 is a schematic side view of a battery pack according to the present invention.

FIG. 1 is a schematic side view of a battery pack BP according to the present invention. This view is perpendicular to first mutually opposite lateral walls S1 (S1.1 and S1.2) of the parallelepiped-shaped container that contains the cells C which define the battery pack.

Said first walls define a first pair of walls, in that they are parallel to one another and arranged opposite one another to define the battery pack.

The concept of "pair" also applies to the other walls S2 and S3 described later on in this document. The cells C have a more or less planar shape and are arranged inside the container so as to be perpendicular to the first lateral walls S1, so that said side view in FIG. 1 shows said cells from the side.

The expression "more or less planar" means that the thickness of the batteries is many times smaller than the other dimensions thereof.

FIG. 1 is a schematic illustration of mutually opposite second walls S2.1 and S2.2, which too are perpendicular to the planar development of the cells C and perpendicular to the walls S1.1 and S1.2 perpendicular to the view direction of FIG. 1.

The walls S1, S2 and S3 that make up the battery pack are more or less planar.

Considering a plane parallel and intermediate to said first walls S1, these are structurally symmetrical with respect to said intermediate plane. This is because coils, that is to say, ducts through which a cooling liquid flows, are housed inside the first walls S1.

The second walls are indicated using different symbols, because they are not structurally symmetrical, in that the first S2.1 of the second walls S2 defines a housing for the electronic monitoring and control devices BMC/BMS of the cells, while the second S2.2 of the second walls is made up of high-voltage electrical components to guarantee the intrinsic electrical safety of the battery pack.

Thus, the vehicular battery pack BP comprises a parallelepiped-shaped container, wherein cells C are arranged in layers L arranged one above the other in the container, and wherein relative monitoring devices BCM of the individual cells are arranged on the second lateral wall S2.1, perpendicular to said layers L and to the first lateral walls 1, perpendicular to said layers L and to said second lateral wall S2.1, wherein said first lateral walls are configured to cool said layers of cells.

Each layer may comprise several cells, for example three, and the cells of each layer are connected to one another in series.

The various layers that make up the battery pack may form a single series connection or they may be connected to form two or more parallel connections of series connections. This clearly depends on the voltage and current to be operationally generated by the battery according to the characteristics of each cell C.

The batteries must be appropriately cooled. This is achieved by means of appropriate trays T made of metal material that drains the heat from the cells and transfers it to the first lateral walls. Therefore, the trays generally have a planar shape and the opposite edges of the tray, facing the lateral walls S1, are shaped so as to contact and transfer heat to said first walls S1.

To achieve the best heat exchange between the cells and the trays, the contact between the cells and said trays is direct. A layer of conductive grease could be applied between the cells and the respective trays in order to promote the exchange of heat.

A layer of cells is mechanically and thermally connected to said tray.

Each of said layers of batteries is preferably connected to a face of a tray T by means of the relative terminals C+ and C− of said cells.

The positive terminals C+ and negative terminals C− are preferably arranged on opposite sides of each cell according to a direction X perpendicular to the second walls S2 (S2.1 and S2.2).

Figure 2:
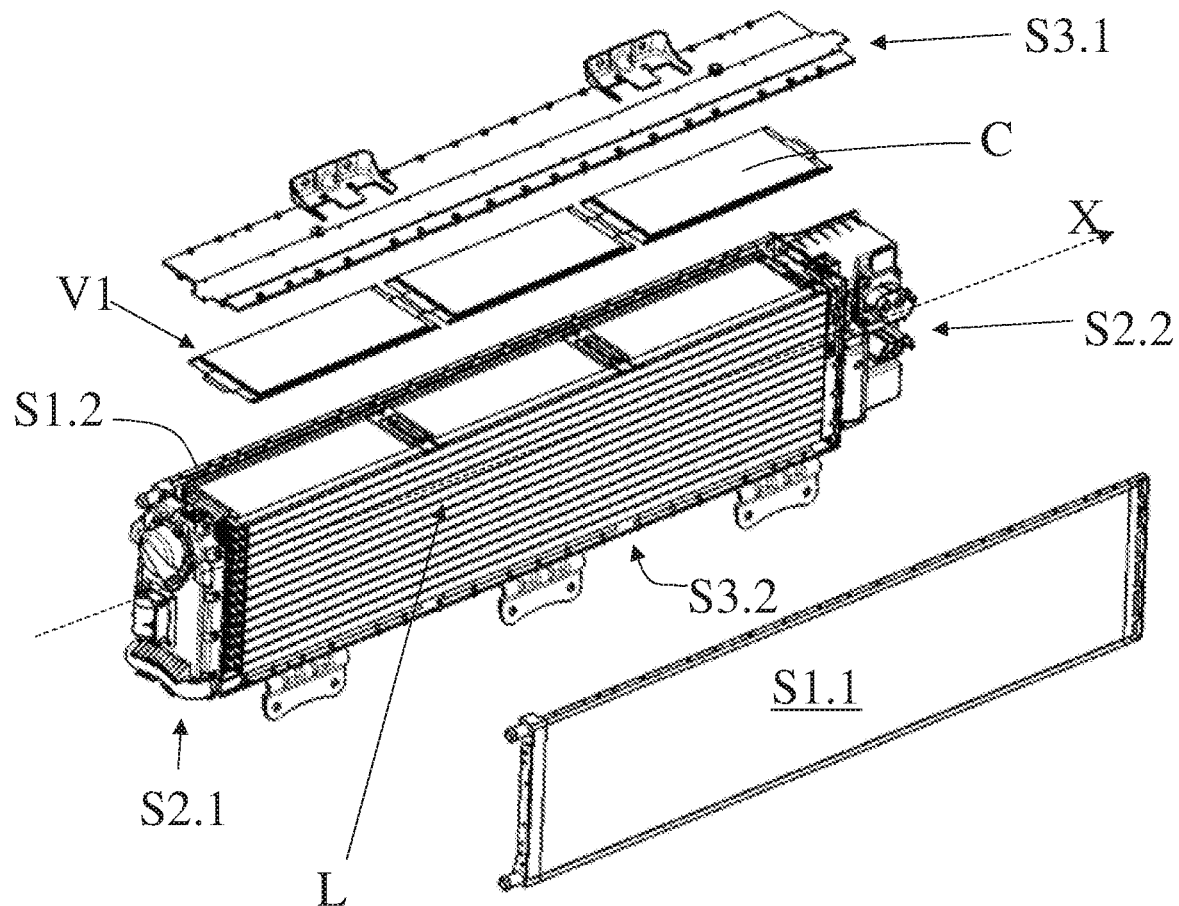
FIG. 2 is a three-dimensional exploded view of an example of implementation of the present invention.
Figure 3:
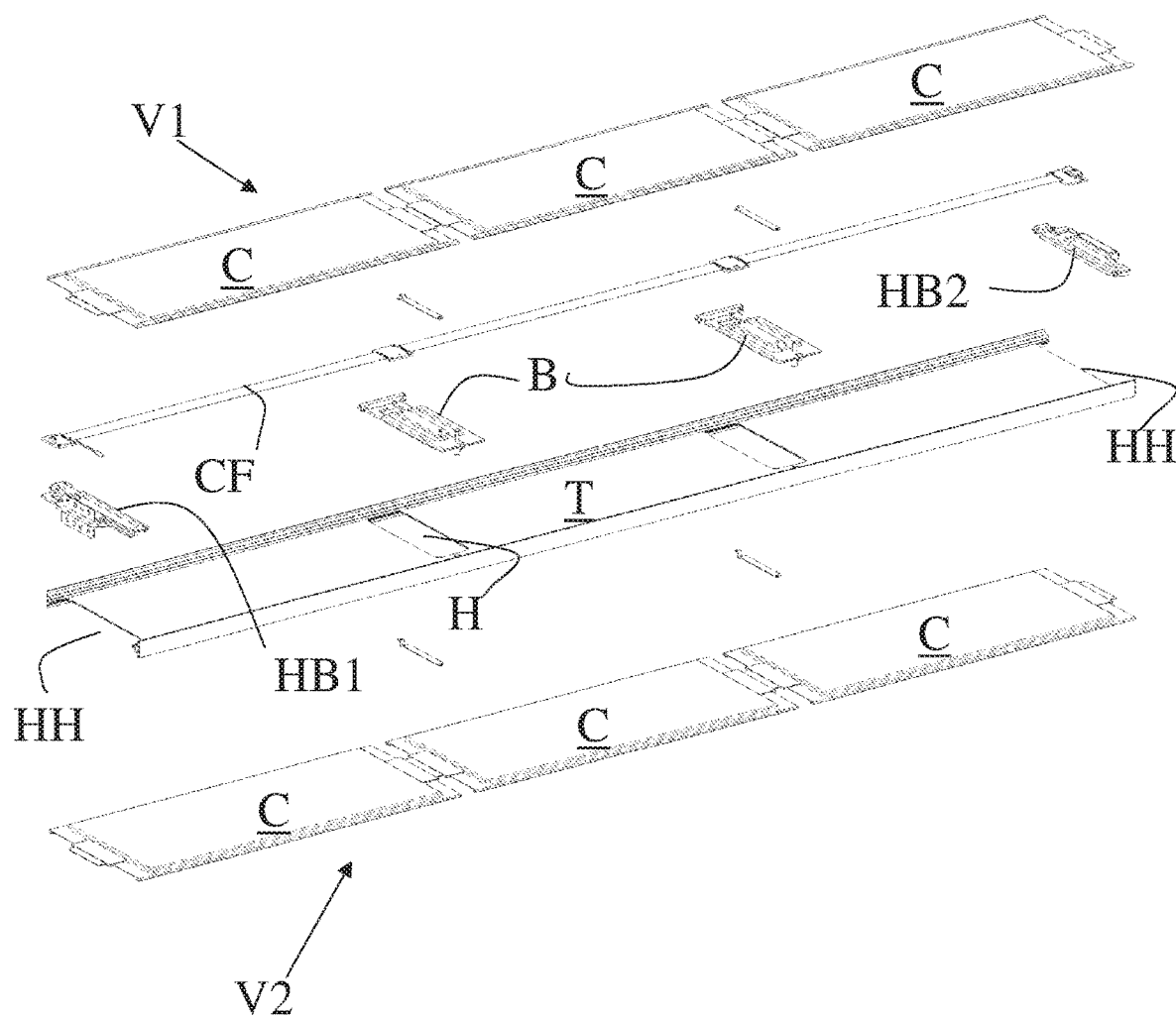
FIG. 3 is an exploded view of a portion of the example shown in FIG. 2.
Figure 8:
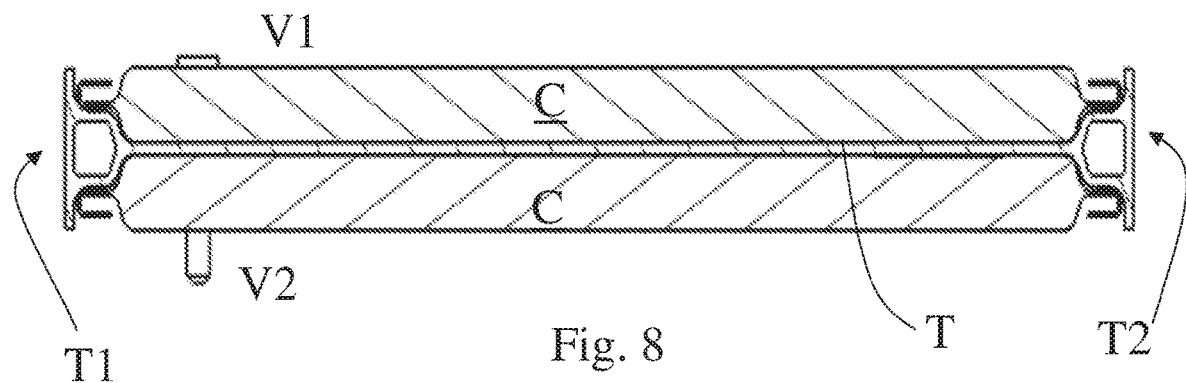
FIGS. 8 and 9 are portions of a cross section of the example shown in FIG. 2
Figure 8A:
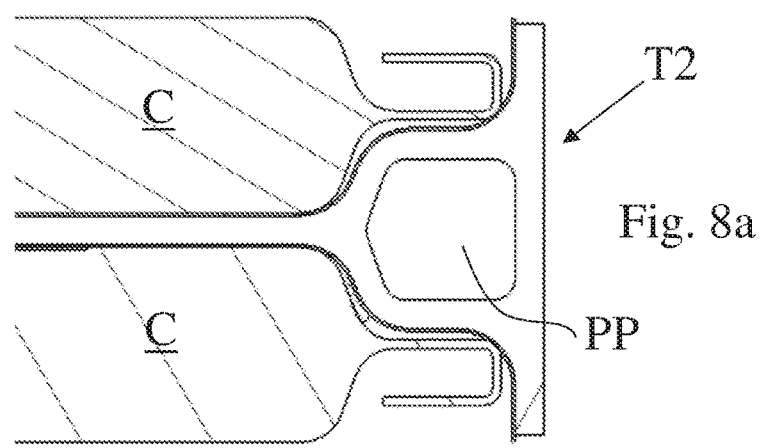
FIG. 8a is an enlarged view of a portion of FIG. 8.
Figure 9:
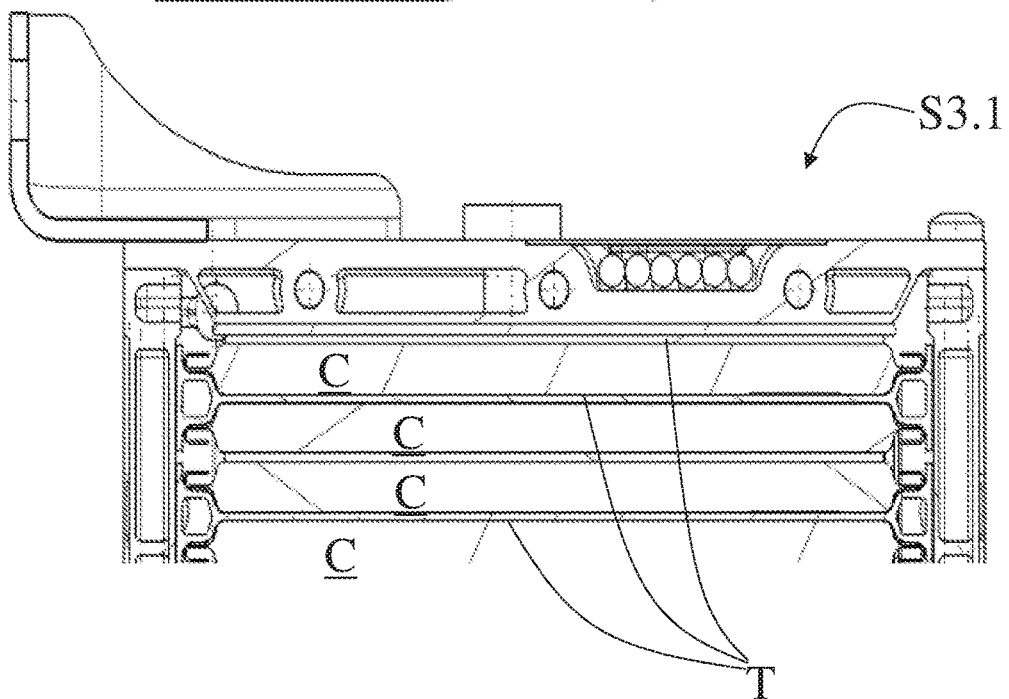
Figure 9A:
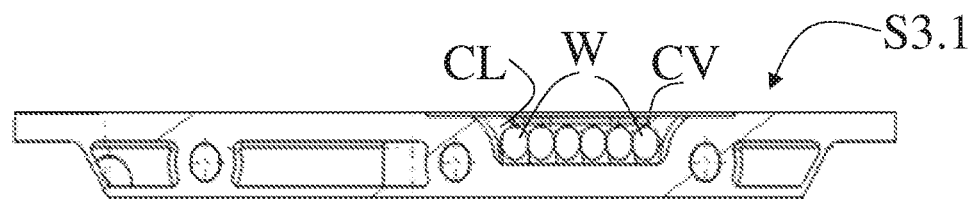
FIG. 9a shows a portion extracted from FIG. 9.

The axis X of FIG. 2 indicates the direction of the longitudinal extension of the trays and therefore of the entire battery pack. Therefore, FIGS. 8, 9 and 9a are cross sections of said longitudinal extension.

Each tray T comprises a housing H, HH and a support B, HB1, HB2 of insulating material suitable to complementarily engage said housing, wherein said support comprises a first band of metal material MB, MB1, MB2 attached to a face of the support and appropriately insulated from said tray, so that, in operating conditions, a terminal C+, C− of at least one cell C is welded to said band of metal material, so that said at least one cell is attached to a relative tray by means of said relative support B, HB1, HB2.

In other words, the cells are attached to the respective trays by their terminals, so that the body of the cells and the relative trays are in direct contact. The conductive grease does not in any way serve to block the cells on the trays.

Thanks to the solution involving the use of such insulating supports, a cell can be connected quickly to a relative tray, while at the same time ensuring the electrical insulation between the terminals of the cell and the tray that is made of metal material to fulfil the aforesaid purposes of draining heat.

As shown in the figures, the cells have a planar extension and define a fairly pronounced rectangular footprint. Therefore they define a longitudinal albeit planar extension. They are arranged so as to be aligned according to the axis X described above.

According to a preferred embodiment of the present invention, the layers are organised in alignments of cells aligned according to said longitudinal extension, therefore the battery pack, if made up of a single alignment for each layer, also has a pronounced longitudinal extension.

The alignments are indicated by the symbols V1, V2, etc. The terminals C+, C− are arranged on the (short) sides of each cell and face another cell of the same alignment, forming a vector.

Thus the cells of an alignment are connected to one another in series and each cell has respective terminals C+, C− arranged on opposite sides of said cell, and the terminals of two adjacent cells are welded to said first band of metal material MB. In that case the support is referred to as an "intermediate support".

Said housing H preferably consists in a through opening obtained in the tray, and the support is substantially flat with two opposite faces that, once it has been inserted in the housing, face the opposite faces of the tray.

The first metal band MB1 is attached to the first face of the support of insulating material and a second metal band MB2, insulated from said first metal band and from said tray, is attached to the second face, opposite the first face. Thus, advantageously, a first alignment of cells V1 could be connected to a face of said tray T and a second alignment of cells V2 could be connected to an opposite face of said tray.

Advantageously, a second alignment of cells V2 is connected to an opposite face of said tray and adjacent terminals of cells of said first alignment are welded to said first metal band MB1 and adjacent terminals of cells of said second alignment are welded to said second metal band MB2, preventing said support from disengaging from said respective housing.

According to a preferred embodiment of the invention the support further comprises a lateral housing LH suitable to receive and permanently support an electric connector PC of a flat cable FC and said connector comprises a first electrical port STP for connecting to it a metal terminal ST suitable, in operating conditions, to interconnect said first metal band ST to said first electrical port STP.

Since the voltage can be measured at all the terminals, the voltage of each cell can be measured.

When two alignments V1, V2 of cells are connected to a first and a second face, opposite said first face, of said tray T, said lateral housing LH preferably consists in a through opening suitable to permanently receive said electric connector PC so that a second electrical port is accessible from said second face and can be connected to said second metal band by means of a relative corresponding metal terminal.

Advantageously, the same flat cable FC interconnects both of the alignments of cells V1 and V2 arranged on the opposite faces of a same tray.

The tray T which has a substantially rectangular shape has end housings HH, preferably, cuts. Connected to each housing there is a relative support HB1 and HB2 of insulating material, defined here as end supports HB1 and HB2, similar to the intermediate supports described above, but with specific features bearing in mind that they must interconnect one alignment with another alignment and not simply two adjacent cells of a same alignment.

Also in this case an end support comprises a first band of metal material MB1 attached to a face and appropriately spaced from said tray, so that, in operating conditions, the terminal C+, C− of at least one head cell C is welded to said band of metal material. For the sake of simplicity, the same symbols and reference numerals are used to indicate components that have the same functions.

When the support of metal material HB1 is used to interconnect alignments of cells connected to two different trays, the first metal band BM1 has an L-shaped section according to a plane perpendicular to said tray and according to the direction X, when in operating conditions, so as to allow the electrical connection to an identical metal band of a head cell, of an adjacent layer of cells, connected to another tray.

Figures 4, 5:
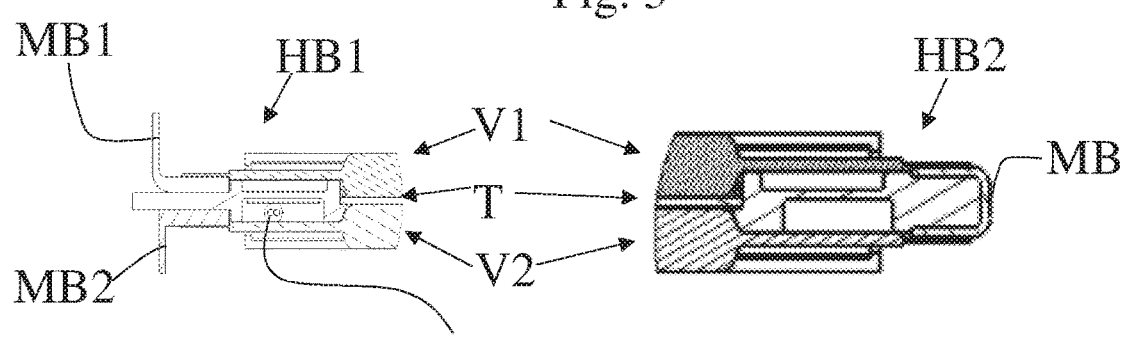
FIGS. 4 and 5 are portions of longitudinal sections of the portion shown in FIG. 3 in assembled conditions according to FIG. 2.

Vice versa, when the two alignments to be interconnected are connected to opposite faces of the same tray, the series connection is achieved by means of a U-shaped metal band MB, see FIG. 5, engaging said support of insulating material HB2 so as to face opposite faces of the support of insulating material and short-circuiting the end terminals of the cells connected to the opposite faces of the same tray.

When all the layers of cells are interconnected by means of the intermediate and head support elements, then all of the cells of the battery pack are in series and therefore the voltage measured at the terminals of the battery pack is equal to the sum of the voltages of all the cells. Thus the free terminals of the head and tail cells are connected to two corresponding busbars inside the battery pack.

The support of insulating material further comprises a lateral housing LH, similarly to the intermediate support, suitable to receive and permanently support an end electric connector PC of the flat cable FC. The connector preferably comprises a temperature sensor TSS that laterally protrudes, so as to contact a relative cell.

The sensor TSS is preferably interposed between two head cells connected to opposite faces of the same tray T. In particular, the sensor is arranged between the terminals of the same cells, which are the hottest points. Temperature sensors may also be connected to the electric connectors supported by the intermediate supports described above.

The monitoring devices BMC of the individual cells are connected to the terminals of the cells by means of the aforesaid flat cable FC attached to a face of said tray T interposed between said layer of cells and said tray.

As already mentioned, each of the first lateral walls S1 comprises a cooling liquid circulation circuit, integrated in the wall, and a relative inlet IN and outlet OUT, so that the inlets and the outlets of both of the first walls S1.1 and S1.2 are arranged at the corners of said second wall S2.1 with openings having axes perpendicular to a plane defining said second wall S2.1 and preferably the relative cooling circuits are connected in series by means of an outer duct PP, so that an inlet IN of the series-circuit, that is to say, of the circuit formed by the series of the circuits contained in the two first lateral walls, and an outlet OUT of the series-circuit are at the consecutive corners of said second wall S2.1 or at opposite corners of said second wall S2.1.

By arranging the cooling circuits laterally with respect to each alignment and connecting only one alignment to each face of the trays, each cell is always subject to the same heat exchange power.

Let us assume that the temperature at the inlet is 50° C. and the temperature of the liquid at the outlet of the first circuit is 75° C. and the temperature at the outlet of the second circuit is 100° C.

Figure 10:
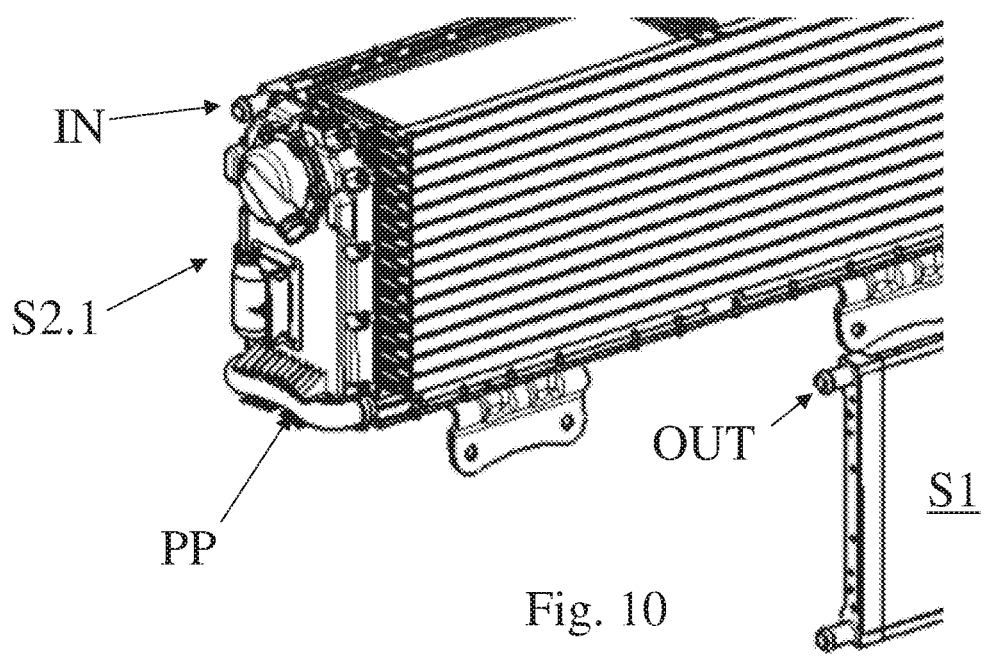
FIGS. 10 and 11 compare two alternative embodiments of a detail of FIG. 2.

With the arrangement shown in FIGS. 1 and 10, the cells of the highest tray feel 50° C. on one side and 100° C. on the other. Whereas the cells of the lowest tray feel 75° C. on both sides, which is equal to the average value felt by the cells of the highest tray.

This however means the highest cells have to be used with a higher temperature gradient on opposite sides.

Figure 11:
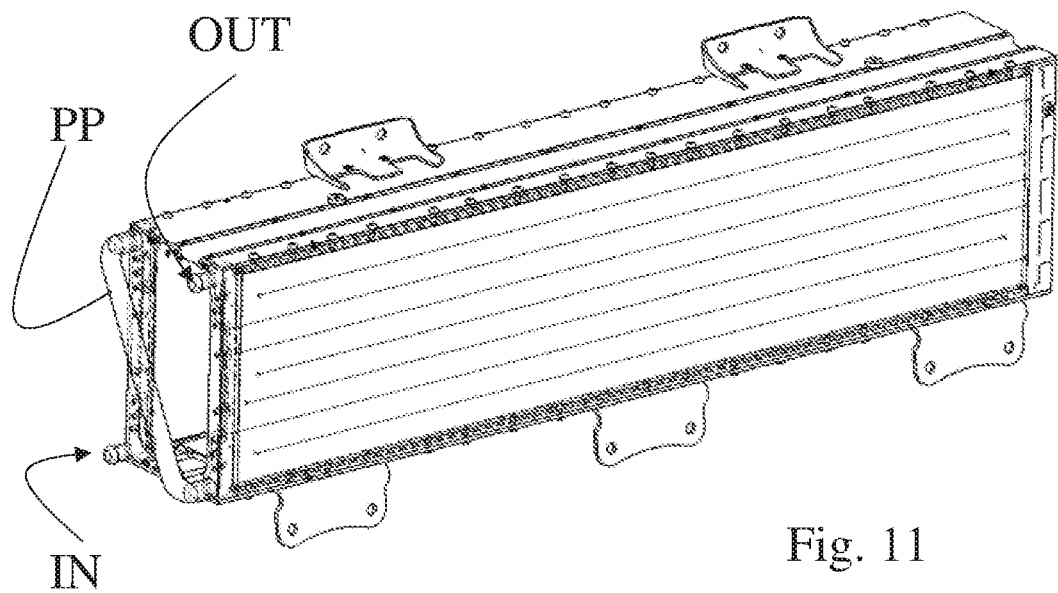

With the solution shown in FIG. 11, in which the outer duct is arranged obliquely, the cells of the highest tray feel 75° C. on one side and 100° C. on the other. Whereas the cells of the lowest tray feel 50° C. on one side and 75° C. on the other side. This means that not only are the cells subject to the same heat exchange power, but also to the same difference in temperature between the opposite sides, which may be useful in relation to the characteristics of the cells used. However, this means that the cells are only subject to uniform heat exchange if there is a difference in temperature between the first and the last layer. In the example, this difference in temperature is 25° C.

Therefore, the first walls have both a thermal and a structural function, as they allow the interconnection of the other walls of the container that form the aforesaid parallelepiped, especially the third walls S3 which are designed to compress the layers between them. During the charging process, the cells tend to dilate perpendicularly in relation to the faces, whereas during discharging, they tend to contract. The compression of the cells, perpendicularly to the relative faces, promotes the contraction of the cells.

Therefore, the lateral walls S1.1 and S1.2 have the function of cooling the battery pack and are dimensioned to withstand a traction force between the third walls S3.1 and S3.2 which compress the layers of cells C. Another purpose of the present invention regards a specific form of each tray.

FIGS. 8 and 9 illustrate cross sections of a plurality of trays.

As can be seen, although the tray is generally flat, it is provided with lateral edges, designed to come into contact with the two thicker first walls S1. Each edge, in a sectional view, approximates a Y shape with the divergent ends of the Y joined by a straight segment.

Said straight segment defines, three dimensionally, a heat exchange wall of the tray with the two first walls S1.

The divergent ends, instead, have several functions:
they double the section of the heat dissipation path; the heat dissipated by the (largest) faces of the cells must be conveyed and transferred to the first walls S1, therefore, thanks to the present solution, the thermal resistance of the tray is reduced up to said straight segment that defines the surface of interaction or interface, with the first walls S1. Said straight segment has an extension which clearly cannot exceed the thickness of two alignments of cells and of the actual tray, otherwise the packing effect deriving from the mutual contact between the cells of due alignments of cells connected to two consecutive trays would be lost;

defined between the divergent ends of the Y-shaped section and said straight segment there is a longitudinal duct according to X, that may have any cross section: triangular, circular, rectangular, which on the one hand makes the tray lighter, while achieving the purposes disclosed in the previous point, and also allows the insertion of electric wires and various sensors to connect temperature sensors or to measure the voltage at the individual cells, as well as the installation of temperature sensors or, for example, an accelerometer;

they contain the cells connected to the opposite faces of the tray, preventing said cells from being damaged as a result of the compression force exerted by the third walls S3 thanks to the support of the second walls S2; and they prevent any crosswise displacement of the cell with respect to the relative tray in the case of a collision.

Said duct defined between the divergent ends of the Y shape does not have the function of circulating liquid, in that the liquid circulates entirely inside the lateral walls S1. As described above, the cells are preferably attached to the tray by means of the terminals on the actual cell and the supports described above. Clearly, the main purpose of these is electrical, although they are sufficient to keep the cells connected to the relative tray during the assembly of the battery pack.

During an accident, accelerations could be such as to cause the supports to break if put under excessive stress. The very shape of the trays, which complements the parallelepiped shape of the cells, is such to block them inside the relative tray.

Advantageously, no adhesive is required to secure the cells to the tray.

FIG. 9a is a detailed view of a cross section of one S3.1 of the walls S3. It is shaped, as described above, to exert a uniform compressive force on the layers of cells.

According to the section in FIG. 9a, it resembles a trussed arch, in which a longitudinal groove CL is obtained to house electric cables W. Said groove is accessible from the outside, after said wall has been connected to the first lateral walls S1.

As described above, the purpose of one S2.1 of the second walls S2 is to group together and enclose the monitoring devices BMC and BMS of the cells grouped together inside the battery pack.

The purpose of the opposite wall S2.2 is to group together and enclose safety devices and high-voltage connections.

Should one or more cells overheat, the monitoring devices must be able to act directly on the safety devices, disconnecting the battery pack from the circuit outside the battery.

In that case, the monitoring devices work with the safety devices arranged on the opposite side of the battery. This is achieved, according to a preferred embodiment of the present invention, by embedding the electric cables W in at least one S3.1 of the third walls S.3.

The longitudinal groove CL is formed so as to be accessible from the outside of the battery pack. Once the electric cables W have been arranged in said groove, a cover CV is fitted, see FIG. 9a.

Figure 12:
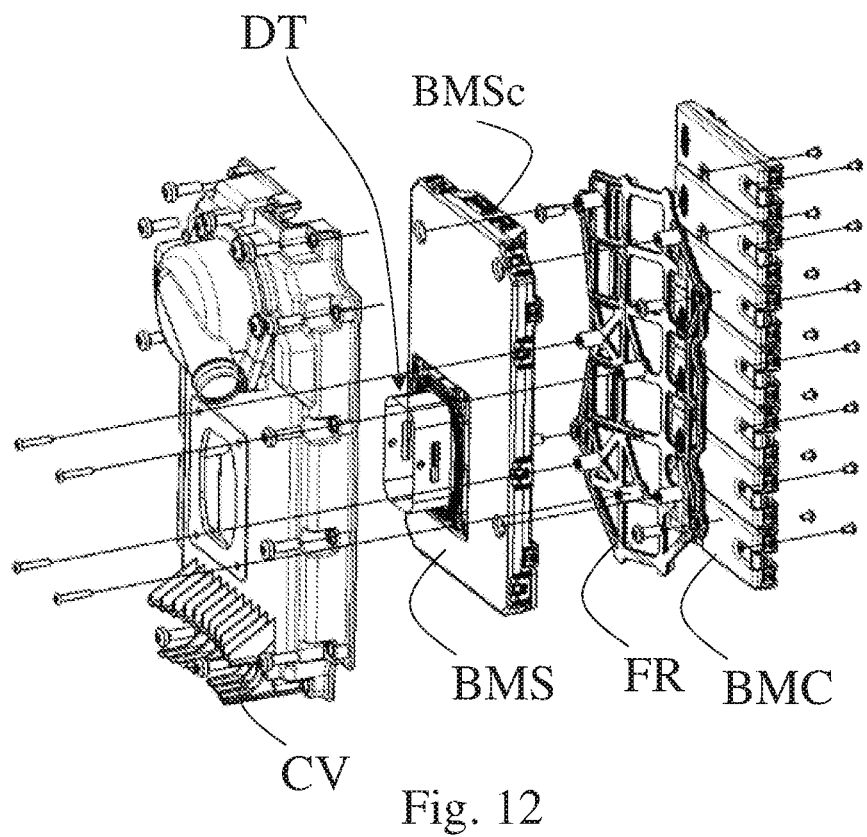
FIG. 12 is an exploded view of the components that form a wall of the container according to the present invention.

FIG. 12 is an exploded view of the first S2.1 of the second walls S2.

From left to right on the sheet there are a cover CV, the BMS that supervises the BMC devices configured as slaves, a frame FR for connecting the BMS to the BMC devices.

The frame FR allows the BMS to be connected directly to the BMC devices which therefore act as a support for the BMS.

The connection between the BMS and the BMC is achieved with an open daisy chain-type serial connection.

Figure 13:
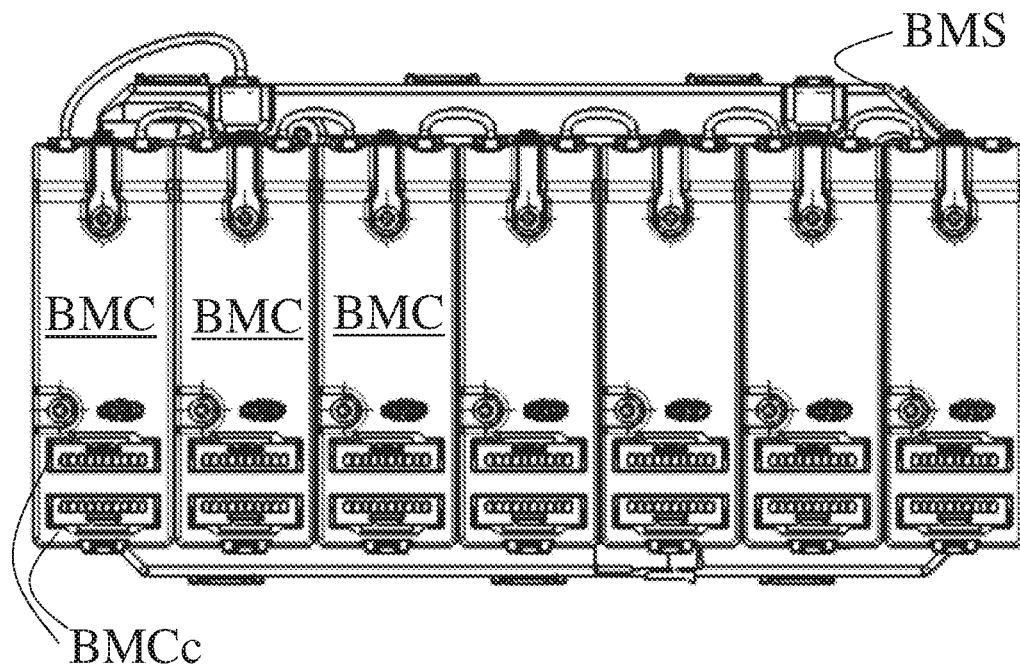
FIG. 13 is a plan view of the wall shown in FIG. 12 seen from inside the battery pack according to the example illustrated in FIG. 2.
Figure 14:
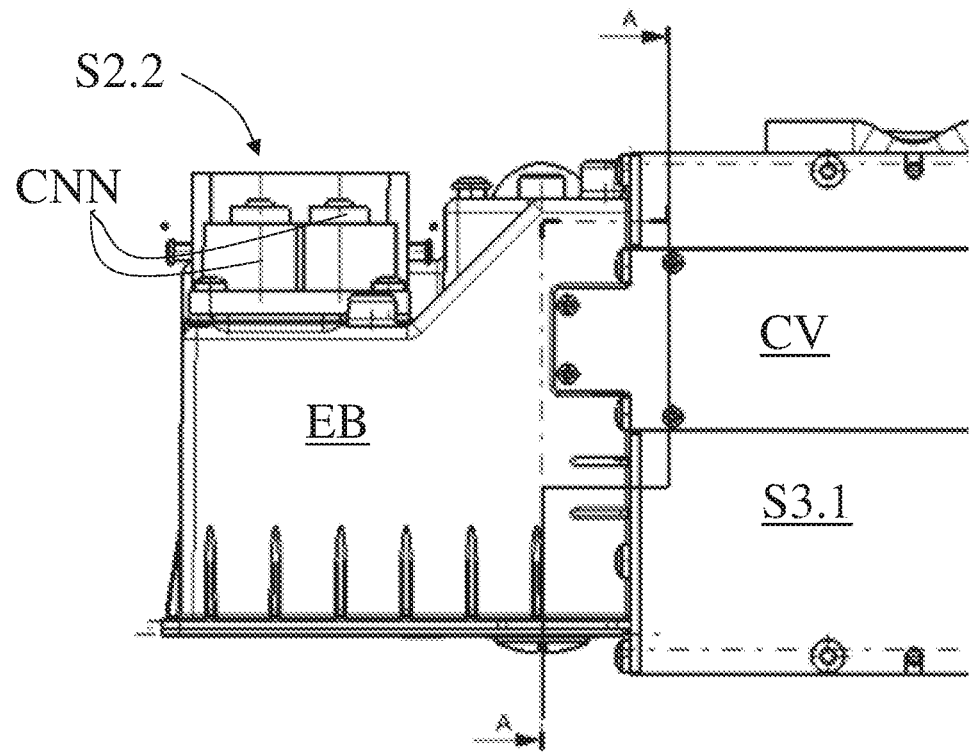
FIG. 14 is a view from above of a portion of the battery pack showing a wall opposite the wall shown in FIGS. 12 and 13.

Therefore the BMC devices are connected in series to define slave devices and the last BMC in the alignment shown in FIG. 13 is connected to the BMS arranged behind said alignment.

The BMC devices, arranged side by side when in operating conditions, define a flat object.

The BMS is also flat and on it there is arranged an electric connector for connecting the BMS to a vehicle data network.

Furthermore, in the same Figure it can be noted that each BMC module comprises a pair of electric connectors BMCc for connecting to a corresponding pair of flat cables, each connected to a tray to control each cell of both of the alignments of cells connected to the opposite faces of each tray.

The second S2.2 of the second lateral walls S2, as mentioned above, includes electrical components, including high-voltage busbars, sensors for measuring the voltage and current of the entire battery pack and safety devices, such as circuit breakers suitable to disconnect the electricity supply when deemed necessary.

Said wall S2.2 is therefore formed by a casing that is more or less parallelepiped in shape, in which said components are preliminarily installed and comprises one or more external connectors PGE for connecting the battery pack to the vehicle's high-voltage power supply system.

When the various electrical components are installed in this wall, the resulting assembly is called E-box EB in that it contains the high-voltage measurement and safety devices.

Said E-box is at least partially open towards the volume delimited by the walls S1 and S2.

Said assembly of components further comprises two terminals TB1 and TB2, one positive and one negative, to be connected to corresponding busbars BB1 and BB2 directly connected to the plurality of cells contained in the battery pack.

Thus, the cells energise the busbars BB1 and BB2 and when the terminals TB1 and TB2 are connected to the busbars they, in turn, are energised.

According to a preferred solution, the terminals TB1 and TB2 are superimposed on the corresponding busbars when the wall S2.2 is moved up against the first S1 and second pre-assembled walls S2.

Said superimposition brings respective holes into alignment.

Next, screws Scw1 and Scw2 are inserted through openings arranged in opposite faces of the parallelepiped defining the wall S2.2 to permanently connect the terminals TB1 and TB2 to the respective busbars BB1 and BB2.

Alternatively, the mutual connection between the terminals and the busbars can be achieved by means of pug/socket connections.

The busbars protrude in the direction of the second wall S2.2 to enter the housing EB defined by said wall S2.2.

When the wall S2.2 is connected to the remaining battery pack each of the busbars can only be accessed through one of the two openings arranged in opposite faces of the housing EB. Advantageously, enabling access to the busbars through opposite faces of the parallelepiped defining the wall S2.2 guarantees greater safety for the operator during the assembly of the battery pack, preventing the possibility of short-circuiting the battery pack.

As shown in FIG. 16, between one busbar BB2 and the terminal TB2, the connection is not direct, but indirect, via a fuse FSE that is accessible through a specific removable door SV2.

Clearly, the wall S2.2 may have a different shape other than a parallelepiped, but without affecting the fact that the connections between terminals and the relative busbars must be accessible through opposite faces of the container defining the wall S2.2 that encloses the relative high-power circuitry.

Furthermore, the fact that while one pair TB1/BB1 come into direct contact with one another when the wall S2.2 is moved up against the remaining pre-assembled battery pack, the other pair TB2/BB2 cannot come into contact until the high-voltage fuse FS2 has been fitted, is extremely advantageous as this prevents the unstable energising of any of the sensors housed in the wall S2.2.

According to a further preferred embodiment of the invention, when the wall S2.2 is physically connected to the remaining battery pack, both of the terminals TB1 and TB2 of the E-box remain appropriately spaced from the busbars BB1 and BB2 towards which the connections of all the cells converge.

To interconnect a terminal with a respective busbar, a fuse must be fitted which thus acts as a bridge. Also in this case the two fuses can be accessed through openings in opposite faces of the E-box which increases the level of safety for the operator during the assembly of the battery pack.

When the wall S2.2 and the remaining battery pack have been mutually assembled, that is, when the perimeter screws illustrated in FIG. 16 have been tightened and the pairs TB1/BB1 and TB2/BB2 have been connected by means of the fuse(s), the door(s) CV2 is(are) fitted and/or a cap Plg made of resilient material is inserted in the opening that gives access to the pair BB1/TB1.

According to a preferred method of assembling the battery pack, the first walls S1.1 and S1.2 are connected to the third wall S3.2 and the trays T, to which the cells have already been connected, are placed inside it.

Next, the BMC devices are connected to the respective flat cables, they are connected in series as shown by the bridges in FIG. 13, and the BMS is arranged above them by means of the aforesaid frame FR, and the BMS is connected to one of the BMC devices.

At the same time, or before or afterwards, the wall S3.1 is also connected to the first walls S1 and said cables W are housed therein, connecting them, by means of a relative end, to a specific connector BMSc of the BMS.

Next, the pre-assembled E-box is brought close and the steps described above are performed, and another end of said cables W is connected to a second electric connector EBc integral with the E-box. This step makes it possible to interconnect the BMS to the safety circuit breakers arranged in the E-box.

Next, the cover CV is fitted to complement said longitudinal groove.

Other embodiments of the non-limiting example of the invention described herein may be implemented without departing from the scope of protection of the present invention, including all the equivalent embodiments implemented by the person skilled in the art.

From the above description it will be possible for the person skilled in the art to implement the invention without the need for any additional construction details. The elements and the characteristics illustrated in the different preferred embodiments, including the drawings, may be combined without departing from the scope of protection of the present application. That described in the discussion of the prior art serves merely to ensure a better understanding of the invention and does not constitute a declaration concerning the existence of that described. Moreover, unless specifically excluded in the detailed description, that described in the discussion of the prior art is to be considered as forming an integral part of the detailed description.

The invention claimed is:

1. A vehicular battery pack (BP) comprising a parallelepiped-shaped container, wherein cells (C) are grouped in layers (L) one above the other in the container, wherein each of said battery layers is connected to a face of a substantially planar-shaped tray (T) through relative terminals (C+, C−) of the same cells; wherein the battery pack also comprises a pair of first lateral walls (S1), perpendicular to said layers (L) and configured to cool said layers of cells; each of said first lateral walls (S1) comprises a cooling liquid circulation circuit, integrated in the wall, and a relative inlet (IN) and outlet (OUT).

2. The battery pack according to claim 1, wherein said cells comprise relative monitoring and supervision devices (BMC, BMS) of each individual cell, arranged so as to define a first (S2.1) of a pair of second lateral walls (S2) of the battery pack, perpendicular to said layers (L) and to said first lateral wall (S1).

3. The battery pack according to claim 1, wherein said tray has opposite edges (T1, T2) shaped so as to contact and transfer heat to said first walls (S1).

4. The battery pack according to claim 1, wherein said tray (T) comprises a housing (H, HH) and a support (B, HB1, HB2) of insulating material suitable to complementarily engage in said housing, wherein said support comprises a first band of metal material (MB) attached to a face of the support and appropriately insulated from said tray, so that, in operating conditions, a terminal (C+, C−) of at least one cell (C) is welded to said band of metal material, so that said at least one cell is attached to a relative tray by means of said relative support (B, HB1, HB2).

5. The battery pack according to claim 1, wherein said layers are organised in alignments (V1, V2), wherein each alignment comprises two or more cells mutually connected in series, with each cell having respective terminals (C+, C−) arranged on opposite sides of the same cell, and wherein terminals of two adjacent cells are welded to said first band of metal material (MB).

6. The battery pack according to claim 4, wherein said housing (H) consists in a through opening wherein said support is substantially flat with two opposite faces, wherein said first metal band (MB1) is attached to a first face and said second metal band (MB2) is attached to a second face, insulated from said first metal band and from said tray.

7. The battery pack according to claim 5, wherein a first alignment of cells (V1) is connected to a first face of said tray (T) and a second alignment of cells (V2) is connected to a second opposite face of said tray.

8. The battery pack according to claim 6, wherein a first alignment of cells (V1) is connected to a first face of said tray (T) and a second alignment of cells (V2) is connected to a second opposite face of said tray and wherein adjacent terminals of cells of said first alignment are welded to said first metal band (MB1) and wherein adjacent terminals of cells of said second alignment are welded to said second metal band, preventing said support from disengaging from said respective housing.

9. The battery pack according to claim 6, wherein said support further comprises a lateral housing (LH) suitable to receive and permanently support an electric connector (PC) of a flat cable (FC) and wherein said connector comprises a first electrical port (STP) for connecting to it a metal terminal (ST) suitable, in operating conditions, to interconnect said first metal band to said first electrical port.

10. The battery pack according to claim 9, wherein when two alignments (V1, V2) of cells are connected to a first and a second face, opposite to said first face, of said tray (T), said lateral housing (LH) consists in a through opening suitable to permanently receive said electric connector (PC) so that a second electrical port is accessible from said second face and can be connected to said second metal band by means of a relative corresponding metal terminal.

11. The battery pack according to claim 4, wherein said housing (HH) is at an end, in a position proximal to one of second lateral walls (S2), and a relative support (HB1, HB2) comprises a first band of metal material (MB1) attached to a face and appropriately spaced from said tray, so that, in operating conditions, the terminal (C+, C−) of at least one head cell (C) is welded to said band of metal material.

12. The battery pack according to claim 11, wherein said first metal band (MB1) has an L-shaped section, when in operating conditions and according to a plane perpendicular to said tray, in order to allow the electrical connection to an identical and opposite metal band of an adjacent layer of cells, connected to an adjacent tray.

13. The battery pack according to claim 11, wherein said tray has a first face and a second face opposite to said first face and wherein a first layer of cells is connected to said first face and a second layer of cells is connected to said second face and wherein two head batteries of a same edge of said tray belonging respectively to said first and second layer of cells are connected in series by means of a U-shaped metal band (MB) fitted to said support of insulating material (HB2) so as to be facing opposite faces of the support of insulating material.

14. The battery pack according to claim 11, wherein said support of insulating material further comprises a lateral housing (LH) suitable to receive and permanently support an electric connector (PC) of a flat cable (FC).

15. The battery pack according to claim 14, wherein said connector comprises a temperature sensor (TSS) that laterally protrudes, so as to contact a relative cell.

16. The battery pack according to claim 2, wherein said monitoring devices (BMC) of the individual cells are connected to terminals of said cells by means of a relative flat cable (FC) attached to a face of said tray (T) interposed between said layer of cells and said tray.

17. The battery pack according to claim 1, wherein the inlets and the outlets of both of the first walls are arranged at the corners of said second wall (S2.1) with openings having an axis perpendicular to a plane identifying said second wall (S2.1).

18. The battery pack according to claim 17, wherein said cooling circuits are connected in series by means of an external duct (PP), so that an inlet (IN) of the series-circuit and an outlet (OUT) of the series-circuit are at the consecutive corners of said second wall (S2.1) or at the opposite corners of said second wall (S2.1).

19. The battery pack according to claim 2, wherein each of said opposite edges (T1, T2) of said tray (T), according to a transversal section, parallel to second walls (S2.1, S2.2), has a Y shape above which there is a straight segment that joins the divergent ends of the Y.

20. The battery pack according to claim 1, wherein said relative monitoring and supervision devices (BMC, BMS) of the individual cells comprise
- a plurality of battery management control (BMC) devices, each of which is configured to monitor at least the cells of one or more layers and
- a battery management system (BMS) comprising data communication ports for communicating with said BMC devices and a data communication port (DT) for communicating with a vehicular data network;

wherein said BMS is physically supported by said plurality of BMC devices.

21. The battery pack according to claim 20, wherein, when the layers of cells are connected to said trays by means of said end support according to claim 12, said BMC devices are physically supported by respective end supports and wherein each BMC device comprises at least one electric connector (BMCc) for said flat cable (FC).

22. An electric or hybrid vehicle comprising an electric motor connected to a vehicular transmission and characterised in that it comprises a battery pack according to claim 1.

* * * * *